(12) United States Patent
Abe (10) Patent No.: US 6,882,605 B1
(45) Date of Patent: Apr. 19, 2005

(54) FOCUSING METHOD, METHOD OF DETECTING FOCAL POINT DEVIATION, METHOD OF FORMING MASTER OF DATA STORAGE MEDIUM, FOCUSING CONTROL UNIT, UNIT FOR DETECTING FOCAL POINT DEVIATION, AND UNIT FOR FORMING MASTER OF DATA STORAGE MEDIUM

(75) Inventor: Shinya Abe, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 757 days.

(21) Appl. No.: 09/711,905

(22) Filed: Nov. 15, 2000

(30) Foreign Application Priority Data

Nov. 16, 1999 (JP) .......................................... 11-324848

(51) Int. Cl.$^7$ ................................................ G11B 7/00
(52) U.S. Cl. ................................ 369/44.38; 369/53.23; 369/53.28; 369/44.11
(58) Field of Search ........................... 369/44.38, 44.29, 369/109, 126, 275.2, 44.11, 44.14, 53.23, 53.28, 118, 44.42, 44.26, 116.121, 112.24, 44.37; 430/270.13, 346, 945, 564; 365/124

(56) References Cited

U.S. PATENT DOCUMENTS

| | | | | |
|---|---|---|---|---|
| 4,264,986 A | * | 4/1981 | Willis ........................... | 365/124 |
| 4,335,173 A | * | 6/1982 | Caraballo ..................... | 428/64.9 |
| 4,624,914 A | * | 11/1986 | Kimura et al. ............ | 430/270.13 |
| 5,659,534 A | * | 8/1997 | Terasaki et al. ............. | 369/116 |
| 5,740,138 A | * | 4/1998 | Hoshino et al. ........... | 369/44.29 |
| 5,905,699 A | * | 5/1999 | Ishibashi ................... | 369/44.26 |
| 6,275,463 B1 | * | 8/2001 | Nagata et al. .............. | 369/118 |

FOREIGN PATENT DOCUMENTS

| | | |
|---|---|---|
| JP | 08077617 | 3/1996 |
| JP | 09007196 | 1/1997 |
| JP | 09054989 | 2/1997 |
| JP | 09245383 | 9/1997 |
| JP | 63298839 | 12/1998 |

OTHER PUBLICATIONS

Japanese Office Action dated Jun. 15, 2003.

* cited by examiner

Primary Examiner—William Korzuch
Assistant Examiner—Kim-Kwok Chu
(74) Attorney, Agent, or Firm—Stevens, Davis, Miller & Mosher, LLP (57) ABSTRACT

Focusing control for maintaining a distance between an objective lens and a recording medium constant is executed using light whose wavelength is longer than that of recording light and whose detection sensitivity is better than that of the recording light, and a deviation of a focal point of the recording light is detected using reflected light which is reflected by the recording medium to thereby correct a control target position for a focusing control circuit, whereby the distance between the objective lens and the recording medium is corrected to a desirable distance throughout recording. In this manner, excellent focusing control is performed on recording light which has a low detection sensitivity and belongs to the UV range, while correcting a focusing control position for the recording light throughout recording. As focusing control is executed such that the focal point of the recording light is located approximately at the center in the direction of a thickness of a photosensitive material film which is disposed on the recording medium, a fine pit is formed accurately.

24 Claims, 7 Drawing Sheets

Development

FIG. 7

FOCUSING METHOD, METHOD OF DETECTING FOCAL POINT DEVIATION, METHOD OF FORMING MASTER OF DATA STORAGE MEDIUM, FOCUSING CONTROL UNIT, UNIT FOR DETECTING FOCAL POINT DEVIATION, AND UNIT FOR FORMING MASTER OF DATA STORAGE MEDIUM

BACKGROUND OF THE INVENTION

1. Field of the Invention

The present invention relates to a focusing method of and a focusing control unit for controlling a focal point of recording light upon a master of a data storage medium such as an optical disk. The present invention further relates to a method of and a unit for detecting a deviation of a focal point of recording light upon a master of a data storage medium such as an optical disk. In addition, the present invention relates to a method of and a unit for forming a master of a data storage medium such as an optical disk. The respective methods and unites described above are suitable to where recording light for recording information has a wavelength belonging to the UV region, and therefore, a sensitivity of a detector for detecting the recording light drops down.

2. Conventional Technique

While optical disks have become popular as compact disks (CD) have become prevalent, there still are ongoing hard endeavors to develop optical disks having higher densities. In addition, digital video disks (DVD) having even higher densities than CDs have been proposed and put in an actual use in the recent years. There is an urgent demand for development of an optical disk having an even higher density for future. To this end, it is very important to develop a technique for forming a master of a data storage medium having a high density which allows finer recording.

Conventional methods for forming a master of a data storage medium require, for the purpose of focusing control, to irradiate He—Ne laser light as control light, through an objective lens, upon a glass substrate (disk) which is applied with a photoresist which shows almost no sensitivity to He—Ne laser light which has a wavelength of 633 nm. More specifically, the He—Ne laser light is irradiated through the objective lens, and a focusing-control optical system performs feedback control such that a distance between the objective lens and the glass substrate stays constant in accordance with a change in reflected light from the glass substrate, whereby focusing control is achieved.

Alternatively, laser light having a wavelength of 458 nm or the like to which a photoresist is sensitive is converged and intermittently irradiated, through an objective lens upon a glass substrate, as recording light for recording pits so that a photoresist on the glass substrate is developed and pits corresponding to a modulation signal representing the recording light are formed.

Alternatively, a different focusing control method for feedback control has been proposed and put in an actual practice which uses recording light alone instead of using different control light different from the recording light such as He—Ne laser light.

However, according to the conventional focusing control method above which uses different control light from recording light, since a control position of the objective lens in feedback control, that is, a distance between the objective lens and a recording medium is determined by the focusing-control optical system, independently of a state of the recording light.

With this method, prior to recording other than in an information storage area of a necessary disk, a state of the recording light is confirmed and a focusing control position is accordingly adjusted to an optimal position. During actual recording, feedback control is performed such that a distance between the objective lens and the glass substrate stays constant while fixing the focusing control position. Hence, when the state of the recording light changes during recording and a deviation from the focusing control position is created, the focusing-control optical system can not detect the deviation, and therefore, the deviation can not be corrected.

A change in the state of the recording light during recording is caused by the following, for example. A spread angle of laser light used as the recording light, which is an element forming a unit for forming a master of a data storage medium, changes, or a distance between two lenses changes due to a change in a temperature of a lens holder of a beam expander and the recording light itself consequently changes, for instance. A temperature of an optical unit holder in the focusing-control optical system positioned on a movable optical table changes, thereby causing a positional and an angular changes. The position of an optical axis is accordingly changed, and hence, a target position for focusing control is changed. Due to a change in the recording light itself or a change in a target position for focusing control, the target position for focusing control deviates from an optimal convergence position of the recording light during recording.

Meanwhile, the feedback method using recording light itself solves the problem above regarding the focus position. However, with a currently used recording unit for recording on a master of a data storage medium using UV light, since the intensity of recording light is small, reflected light from a recording medium is weak and a sensitivity of a light detecting apparatus is low, and therefore, it is not easy to obtain a signal which is sufficient for feedback control for focusing control.

Further, after irradiating the recording light upon the recording medium in which a photosensitive material film (photoresist) is applied to a surface of a glass base (glass disk), the photosensitive material film is exposed and developed, and an elliptic pit or a continuous groove is formed in the photosensitive material film of the recording medium. At this stage, the focusing control system performs focusing control, aiming at ensuring that a focal point of the recording light matches with a surface of the photosensitive material film.

However, as focusing control is performed such that the surface of the photosensitive material film is at the position of the focal point, since a film thickness of the photosensitive material film is not a negligible value in the focusing control system, the recording light gradually spreads out until reaching an interface between the glass base and the photosensitive material film after impinging upon the surface of the photosensitive material film. When the photosensitive material film is exposed in this condition, an average diameter of the recording light in the photosensitive material film increases, and therefore, it is difficult to accurately form a fine pit.

Further, even when focusing control is realized in a stable manner, the focusing control system has a deviation (a focusing deviation, as generally known) which is determined by a gain of the feedback control system, and the focusing control position varies within a range of the deviation. Hence, in a condition that focusing control is performed such that the surface of the photosensitive material film is at the position of the focal point, the position of the focal point of the recording light varies in accordance with a focusing deviation and is often located outside the photosensitive material film. This increases an amount of out-of-focus, expands the average diameter of the recording light even larger, and makes it further difficult to accurately form a fine pit.

SUMMARY OF THE INVENTION

An object of the present invention is to provide a focusing method, a focusing control unit and a method of and a unit for forming a master of a data storage medium, with which it is possible to form a fine pit accurately.

Other object of the present invention is to provide a focusing method, a focusing control unit and a method of and a unit for forming a master of a data storage medium, with which it is possible to always maintain a focusing control position at an optimal position while realizing an excellent focusing control characteristic even when laser light belonging to the UV region to which a detector is less sensitive is used as recording light.

Further, yet another object of the present invention is to provide a focal point deviation detecting method and a focal point deviation detecting unit, with which it is possible to easily detect a discrepancy of a distance between an objective lens and a recording medium from a desirable distance due to a change in a state of recording light during recording.

A focusing method according to the present invention is a focusing method used in a data storage medium master generating unit. In the focusing method, recording light which is modulated in accordance with information to be recorded is converged through an objective lens which is focusing-controlled such that a distance from a recording medium, in which a photosensitive material film is applied to a surface of a base, remains constant, and information is accordingly recorded on the recording medium. The objective lens is focusing-controlled to a state that the position of a focal point of the objective lens has shifted a predetermined fine distance which is smaller than a film thickness of the photosensitive material film, in the direction of thickness, toward inside from a surface of the photosensitive material film.

According to this method, since the objective lens is focusing-controlled to the state that the position of the focal point of the objective lens has shifted the predetermined fine distance which is smaller than the film thickness of the photosensitive material film in the direction of thickness toward inside from the surface of the photosensitive material film, it is possible to reduce spreading of the recording light inside the photosensitive material film, and hence, decrease an average diameter of the recording light within the photosensitive material film. As a result, it is possible to form a fine pit accurately.

The predetermined fine distance above is preferably has a value which is in the range of approximately ⅓ to ⅔ of the film thickness of the photosensitive material film, and most preferably, a value which is approximately ½ of the film thickness of the photosensitive material film.

With the predetermined fine distance set as described above, even when the position of the focal point of the recording light changes in accordance with a focusing deviation, it is possible to suppress development of a state that the focal point is located outside the photosensitive material film, and hence, to form a fine pit even more accurately.

Further, the objective lens is focusing-controlled, as feedback control for maintaining the distance between the objective lens and the recording medium constant is executed using different light whose wavelength is longer than that of the recording light, for example, the discrepancy of the distance between the objective lens and the recording medium from the desirable distance is detected using reflected light which is generated as the recording medium reflects the recording light, and a control target position for feedback control is corrected based on the detected discrepancy such that the distance between the objective lens and the recording medium becomes the desirable distance.

According to this method, focusing control for maintaining the distance between the objective lens and the recording medium constant is executed using long-wavelength light, such as red light, to which a light detecting apparatus is sensitive enough for the purpose of obtaining an excellent S/N characteristic, the discrepancy of the distance between the objective lens and the recording medium from the desirable distance is detected using the reflected light which is generated as the recording medium reflects the recording light, and the control target position for feedback control is corrected based on the detected discrepancy such that the distance between the objective lens and the recording medium becomes the desirable distance. Hence, it is possible to always maintain a position for focusing control at an optimal position while ensuring an excellent focusing control characteristic, even if laser light of the UV region to which a detector is less sensitive is used as the recording light.

A focusing method according to the present invention is used in a unit for forming a master of a data recording medium, in which recording light which is modulated in accordance with information to be recorded is converged through an objective lens which is focusing-controlled such that a distance from a recording medium remains constant, and information is recorded on the recording medium. In this method, feedback control is performed using different light whose wavelength is longer than that of the recording light such that a distance between the objective lens and the recording medium remains constant, a discrepancy of the distance between the objective lens and the recording medium from a desirable distance is detected using reflected light which is generated as the recording medium reflects the recording light, and a control target position for the feedback control is corrected based on the detected discrepancy such that the distance between the objective lens and the recording medium becomes the desirable distance.

In this method, focusing control for maintaining the distance between the objective lens and the recording medium constant is executed using long-wavelength light, such as red light, to which a light detecting apparatus is sensitive enough for the purpose of obtaining an excellent S/N characteristic, the discrepancy of the distance between the objective lens and the recording medium from the desirable distance is detected using the reflected light which is generated as the recording medium reflects the recording light, and the control target position for feedback control is corrected based on the detected discrepancy such that the distance between the objective lens and the recording medium becomes the desirable distance. Hence, it is possible to always maintain a position for focusing control at an optimal position while ensuring an excellent focusing control characteristic, even if laser light of the UV region to which a detector is less sensitive is used as the recording light.

In a method of detecting a deviation of the position of a focal point according to the present invention, based on an intensity distribution of reflected light which is generated as a recording medium reflects, through an objective lens, recording light which is modulated in accordance with information to be recorded, a discrepancy of a distance between the objective lens and the recording medium from a desirable distance is detected.

Using this method, it is possible to easily detect the discrepancy of the distance between the objective lens and the recording medium from the desirable distance which is created as a state of the recording light changes during recording.

The method immediately above may use as the intensity distribution of the reflected light, an intensity distribution of a spot of the reflected light which is projected on a light receiving surface which is arranged confocal with respect to the recording medium, for example. It is preferable to detect the discrepancy of the distance between the objective lens and the recording medium from the desirable distance based on an intensity at the center inside the spot and a distance between the center of the spot and a point at which an intensity of a diffraction ring is maximum, or based on the intensity at the center inside the spot and an intensity of a diffraction ring of the spot.

A method of forming a master of a data recording medium according to the present invention is a method in which recording light which is modulated in accordance with information to be recorded is converged through an objective lens which is focusing-controlled such that a distance from a recording medium remains constant, and information is accordingly recorded on the recording medium. In the method, focusing control of the objective lens is executed to a state that the position of a focal point of the objective lens has shifted a predetermined fine distance which is smaller than a film thickness of a photosensitive material film, in the direction of thickness, toward inside from a surface of the photosensitive material film.

In this method, since the objective lens is focusing-controlled to the state that the position of the focal point of the objective lens has shifted the predetermined fine distance, which is smaller than the film thickness of the photosensitive material film in the direction of thickness toward inside from the surface of the photosensitive material film, it is possible to reduce spreading of the recording light inside the photosensitive material film, and hence, decrease an average diameter of the recording light within the photosensitive material film. As a result, it is possible to form a fine pit accurately.

The predetermined fine distance above is preferably has a value which is in the range of approximately ⅓ to ⅔ of the film thickness of the photosensitive material film, and most preferably, a value which is approximately ½ of the film thickness of the photosensitive material film.

With the predetermined fine distance set as described above, even when the position of the focal point of the recording light changes in accordance with a focusing deviation, it is possible to suppress development of a state that the focal point is located outside the photosensitive material film, and hence, form a fine pit even more accurately.

Further, the objective lens is focusing-controlled, as feedback control for maintaining the distance between the objective lens and the recording medium constant is executed using different light whose wavelength is longer than that of the recording light, for example, the discrepancy of the distance between the objective lens and the recording medium from the desirable distance is detected using reflected light which is generated as the recording medium reflects the recording light, and a control target position for feedback control is corrected based on the detected discrepancy such that the distance between the objective lens and the recording medium becomes the desirable distance.

In this method, focusing control for maintaining the distance between the objective lens and the recording medium constant is executed using long-wavelength light, such as red light, to which a light detecting apparatus is sensitive enough for the purpose of obtaining an excellent S/N characteristic, the discrepancy of the distance between the objective lens and the recording medium from the desirable distance is detected using the reflected light which is generated as the recording medium reflects the recording light, and the control target position for feedback control is corrected based on the detected discrepancy such that the distance between the objective lens and the recording medium becomes the desirable distance. Hence, it is possible to always maintain a position for focusing control at an optimal position while ensuring an excellent focusing control characteristic, even if laser light of the UV region to which a detector is less sensitive is used as the recording light.

A method of forming a master of a data recording medium according to the present invention is a method in which recording light which is modulated in accordance with information to be recorded is converged through an objective lens which is focusing-controlled such that a distance from a recording medium remains constant, and information is accordingly recorded on the recording medium. In the method, feedback control is performed using different light whose wavelength is longer than that of the recording light such that a distance between the objective lens and the recording medium remains constant, a discrepancy of the distance between the objective lens and the recording medium from a desirable distance is detected using reflected light which is generated as the recording medium reflects the recording light, and a control target position for the feedback control is corrected based on the detected discrepancy such that the distance between the objective lens and the recording medium becomes the desirable distance.

In this method, focusing control for maintaining the distance between the objective lens and the recording medium constant is executed using long-wavelength light, such as red light, to which a light detecting apparatus is sensitive enough for the purpose of obtaining an excellent S/N characteristic, the discrepancy of the distance between the objective lens and the recording medium from the desirable distance is detected using the reflected light which is generated as the recording medium reflects the recording light, and the control target position for feedback control is corrected based on the detected discrepancy such that the distance between the objective lens and the recording medium becomes the desirable distance. Hence, it is possible to always maintain a position for focusing control at an optimal position while ensuring an excellent focusing control characteristic, even if laser light of the UV region to which a detector is less sensitive is used as the recording light.

A focusing control unit according to the present invention is used in a unit for forming a master of a data recording medium, in which recording light modulated in accordance with information to be recorded is converged through an objective lens which is focusing-controlled such that a distance from a recording medium remains constant, and information is recorded on the recording medium. The focusing control unit is characterized in that it comprises focusing control means which focusing-controls the objective lens to a state that the position of a focal point of the objective lens has shifted a predetermined fine distance which is smaller than a film thickness of a photosensitive material film, in the direction of thickness, toward inside from a surface of the photosensitive material film.

In this structure, since the objective lens is focusing-controlled to the state that the position of the focal point of the objective lens has shifted the predetermined fine distance smaller than a film thickness of the photosensitive material film in the direction of thickness toward inside from the surface of the photosensitive material film, it is possible to reduce spreading of the recording light inside the photosensitive material film, and hence, decrease an average diameter of the recording light within the photosensitive material film. As a result, it is possible to form a fine pit accurately.

The predetermined fine distance above is preferably has a value which is in the range of approximately ⅓ to ⅔ of the film thickness of the photosensitive material film, and most preferably, a value which is approximately ½ of the film thickness of the photosensitive material film.

With the predetermined fine distance set as described above, even when the position of the focal point of the recording light changes in accordance with a focusing deviation, it is possible to suppress development of a state that the focal point is located outside the photosensitive material film, and hence, form a fine pit even more accurately.

Further, the focusing control means comprises: feedback control means which maintains a distance between the objective lens and the recording medium constant using different light whose wavelength is longer than that of the recording light, for example; position detecting means which detects a discrepancy of the distance between the objective lens and the recording medium from a desirable distance using reflected light which is generated as the recording medium reflects the recording light; and control position correcting means which corrects a control target position of the feedback control means such that the distance between the objective lens and the recording medium becomes the desirable distance based on the discrepancy which is detected by the position detecting means.

In this structure, focusing control for maintaining the distance between the objective lens and the recording medium constant is executed using long-wavelength light, such as red light, to which a light detecting apparatus is sensitive enough for the purpose of obtaining an excellent S/N characteristic, the discrepancy of the distance between the objective lens and the recording medium from the desirable distance is detected using the reflected light which is generated as the recording medium reflects the recording light, and the control target position for feedback control is corrected based on the detected discrepancy such that the distance between the objective lens and the recording medium becomes the desirable distance. Hence, it is possible to always maintain a position for focusing control at an optimal position while ensuring an excellent focusing control characteristic, even if laser light of the UV region to which a detector is less sensitive is used as the recording light.

A focusing control unit according to the present invention is used in a unit for forming a master of a data recording medium, in which, recording light which is modulated in accordance with information to be recorded is converged through an objective lens which is focusing-controlled such that a distance from a recording medium remains constant, and information is recorded on the recording medium. The focusing control unit is characterized in comprising: feedback control means which maintains a distance between the objective lens and the recording medium constant using different light whose wavelength is longer than that of the recording light; position detecting means which detects a discrepancy of the distance between the objective lens and the recording medium from a desirable distance using reflected light which is generated as the recording medium reflects the recording light; and control position correcting means which corrects a control target position of the feedback control means such that the distance between the objective lens and the recording medium becomes the desirable distance based on the discrepancy which is detected by the position detecting means.

In this structure, focusing control for maintaining the distance between the objective lens and the recording medium constant is executed using long-wavelength light, such as red light, to which a light detecting apparatus is sensitive enough for the purpose of obtaining an excellent S/N characteristic, the discrepancy of the distance between the objective lens and the recording medium from the desirable distance is detected using the reflected light which is generated as the recording medium reflects the recording light, and the control target position for feedback control is corrected based on the detected discrepancy such that the distance between the objective lens and the recording medium becomes the desirable distance. Hence, it is possible to always maintain a position for focusing control at an optimal position while ensuring an excellent focusing control characteristic, even if laser light of the UV region to which a detector is less sensitive is used as the recording light.

A focal point deviation detecting unit according to the present invention comprises light receiving means which detects an intensity distribution of light which impinges upon a light receiving surface and judgement means which judges the intensity distribution of the light which is detected by the light receiving means, and is characterized in that the light receiving means detects an intensity distribution of reflected light which is generated as a recording medium reflects through an objective lens recording light which is modulated in accordance with information to be recorded, and the judgement means judges the intensity distribution of the reflected light which is detected, whereby a discrepancy of the distance between the objective lens and the recording medium from a desirable distance is detected.

Using this structure, it is possible to easily detect the discrepancy of the distance between the objective lens and the recording medium from the desirable distance which is created as a state of the recording light changes during recording.

In the focal point deviation detecting unit above, the light receiving means is preferably arranged such that the light receiving surface of the light receiving means is confocal with respect to the recording medium. It is desirable to detect the discrepancy of the distance between the objective lens and the recording medium from the desirable distance, by detecting an intensity at the center inside the spot and a distance between the center of the spot and a point at which an intensity of a diffraction ring is maximum, or by detecting an intensity at the center inside the spot and an intensity of a diffraction ring of the spot.

A unit for forming a master of a data recording medium according to the present invention is such a unit in which recording light which is modulated in accordance with information to be recorded is converged through an objective lens which is focusing-controlled such that a distance from a recording medium remains constant, and information is recorded on the recording medium. The unit according to the present invention is characterized in comprising focusing control means which focusing-controls the objective lens to a state that the position of a focal point of the objective lens has shifted a predetermined fine distance which is smaller than a film thickness of a photosensitive material film in the direction of thickness toward inside from a surface of the photosensitive material film.

In this structure, since the objective lens is focusing-controlled to the state that the position of the focal point of the objective lens has shifted the predetermined fine distance smaller than the film thickness of the photosensitive material film in the direction of thickness toward inside from the surface of the photosensitive material film, it is possible to reduce spreading of the recording light inside the photosensitive material film, and hence, decrease an average diameter of the recording light within the photosensitive material film. As a result, it is possible to form a fine pit accurately.

The predetermined fine distance above is preferably has a value which is in the range of approximately ⅓ to ⅔ of the film thickness of the photosensitive material film, and most preferably, a value which is approximately ½ of the film thickness of the photosensitive material film.

With the predetermined fine distance set as described above, even when the position of the focal point of the recording light changes in accordance with a focusing deviation, it is possible to suppress development of a state that the focal point is located outside the photosensitive material film, and hence, form a fine pit even more accurately.

Further, the focusing control means comprises: feedback control means which maintains a distance between the objective lens and the recording medium constant using different light whose wavelength is longer than that of the recording light; position detecting means which detects a discrepancy of the distance between the objective lens and the recording medium from a desirable distance using reflected light which is generated as the recording medium reflects the recording light; and control position correcting means which corrects a control target position of the feedback control means such that the distance between the objective lens and the recording medium becomes the desirable distance based on the discrepancy which is detected by the position detecting means.

In this structure, focusing control for maintaining the distance between the objective lens and the recording medium constant is executed using long-wavelength light, such as red light, to which a light detecting apparatus is sensitive enough for the purpose of obtaining an excellent S/N characteristic, the discrepancy of the distance between the objective lens and the recording medium from the desirable distance is detected using the reflected light which is generated as the recording medium reflects the recording light, and the control target position for feedback control is corrected based on the detected discrepancy such that the distance between the objective lens and the recording medium becomes the desirable distance. Hence, it is possible to always maintain a position for focusing control at an optimal position while ensuring an excellent focusing control characteristic, even if laser light of the UV region to which a detector is less sensitive is used as the recording light.

A unit for forming a master of a data recording medium according to the present invention is such a unit in which recording light which is modulated in accordance with information to be recorded is converged through an objective lens which is focusing-controlled such that a distance from a recording medium remains constant, and information is recorded on the recording medium. The unit according to the present invention is characterized in comprising: feedback control means which maintains a distance between the objective lens and the recording medium constant using different light whose wavelength is longer than that of the recording light; position detecting means which detects a discrepancy of the distance between the objective lens and the recording medium from a desirable distance using reflected light which is generated as the recording medium reflects the recording light; and control position correcting means which corrects a control target position of the feedback control means such that the distance between the objective lens and the recording medium becomes the desirable distance based on the discrepancy which is detected by the position detecting means.

In this structure, focusing control for maintaining the distance between the objective lens and the recording medium constant is executed using long-wavelength light, such as red light, to which a light detecting apparatus is sensitive enough for the purpose of obtaining an excellent S/N characteristic, the discrepancy of the distance between the objective lens and the recording medium from the desirable distance is detected using the reflected light which is generated as the recording medium reflects the recording light, and the control target position for feedback control is corrected based on the detected discrepancy such that the distance between the objective lens and the recording medium becomes the desirable distance. Hence, it is possible to always maintain a position for focusing control at an optimal position while ensuring an excellent focusing control characteristic, even if laser light of the UV region to which a detector is less sensitive is used as the recording light.

DETAILED DESCRIPTION OF THE PREFERRED EMBODIMENTS

Now, preferred embodiments will be described with reference to the associated drawings, in relation to a focusing method, a method of detecting a deviation of the position of a focal point, a method of forming a master of a data storage medium, a focusing control unit, a unit for detecting a deviation of the position of a focal point, and a unit for forming a master of a data storage medium according to the present invention.

Figure 1:
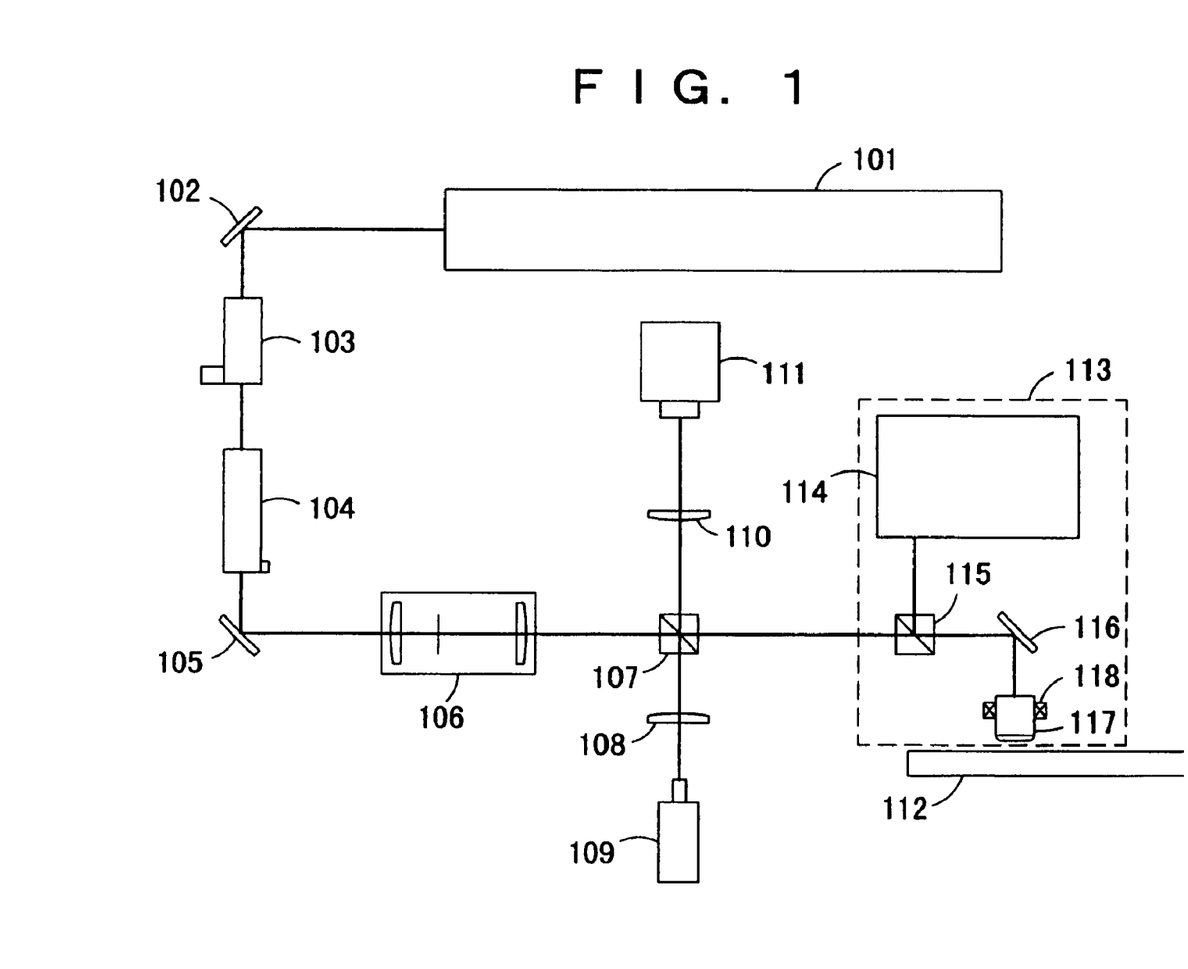
FIG. 1 is an outline view for describing a method of and a unit for forming a master of a data storage medium according to a preferred embodiment of the present invention.

FIG. 1 is an outline view showing a structure of a unit for forming a master of a data storage medium according to a preferred embodiment of the present invention. In the data storage medium master generating unit, as shown in FIG. 1, recording light having a wavelength of 351 nm emitted from an argon ion laser which is a recording light source 101 is reflected approximately at a right angle by a mirror 102, and a light intensity adjuster 103 adjusts a light intensity.

The light now having an adjusted light intensity is modulated by an optical modulator 104 in accordance with information to be recorded, reflected approximately at a right angle by a mirror 105, and expanded and accordingly made into parallel light by a beam expander 106.

A portion of the parallel light is reflected approximately at a right angle by a beam splitter 107, and the remainder of the parallel light is transmitted and guided onto a movable optical table 113. The reflected light is converged by a plano-convex lens 108, and impinges upon a photodiode 109 whose output is used to monitor an average intensity of the recording light.

Disposed on the movable optical table 113 are a focusing-control optical system 114 which uses an He—Ne laser having a wavelength of 633 nm to perform focusing control by a skew method, a first dichroic mirror 115 which synthesizes recording light from the recording light source 101 with focusing control light from the focusing-control optical system 114, a second dichroic mirror 116 which reflects light having wavelengths of both the recording light and the focusing control light, and an objective lens 117 equipped with an actuator 118 for converging the recording light.

The recording light incident upon the movable optical table 113 is converged by the objective lens 117 and irradiated upon a recording medium 112. A portion of the irradiation light is reflected by a surface of the recording medium 112, namely, a surface of the photoresist, and returns to the beam splitter 107. A portion of the reflected light is approximately at a right angle by the beam splitter 107, converged by a lens 110, and imaged on a light receiving surface of a CCD camera 111. At this stage, the light receiving surface of the CCD camera 111 and the recording medium 112 are arranged confocal to each other. The recording medium 112 is obtained by applying a photosensitive material film into a film thickness of about 50 through 100 nm to a surface of a glass base such as a transparent circular glass disk. The photosensitive material film is sensitive to the recording light having a wavelength of 351 nm emitted from the argon ion laser, but is not sensitive to the He—Ne laser light having a wavelength of 633 nm.

Using the structure described above, two focusing methods described below are implemented. The first focusing method requires to focusing-control the objective lens to a state that the position of a focal point of the objective lens 117 has shifted a predetermined fine distance which is smaller than a film thickness of the photosensitive material film, in the direction of thickness, toward inside from a surface of the photosensitive material film. For the purpose of accurately forming a pit and for the purpose of ensuring that the focal point position is not located outside the photosensitive material film even despite a change in the focal point position due to a focusing deviation, the predetermined fine distance described above preferably has a value in the range of approximately ⅓ to ⅔ of the film thickness of the photosensitive material film, and most preferably is approximately ½ of the film thickness of the photosensitive material film.

In the second focusing method, feedback control is performed using different light whose wavelength is longer than that of the recording light such that a distance between the objective lens 117 and the recording medium 112 remains constant, a discrepancy of the distance between the objective lens 117 and the recording medium 112 from a desirable distance is detected using the reflected light which is generated as the recording medium 112 reflects the recording light, and a control target position for feedback control is corrected such that the distance between the objective lens 117 and the recording medium 112 becomes the desirable distance based on the detected discrepancy.

Further, the second focusing method may be combined with the first focusing method.

Still further, the first and second focusing methods may be applied to a method for forming a master of a data recording medium.

Figure 2:
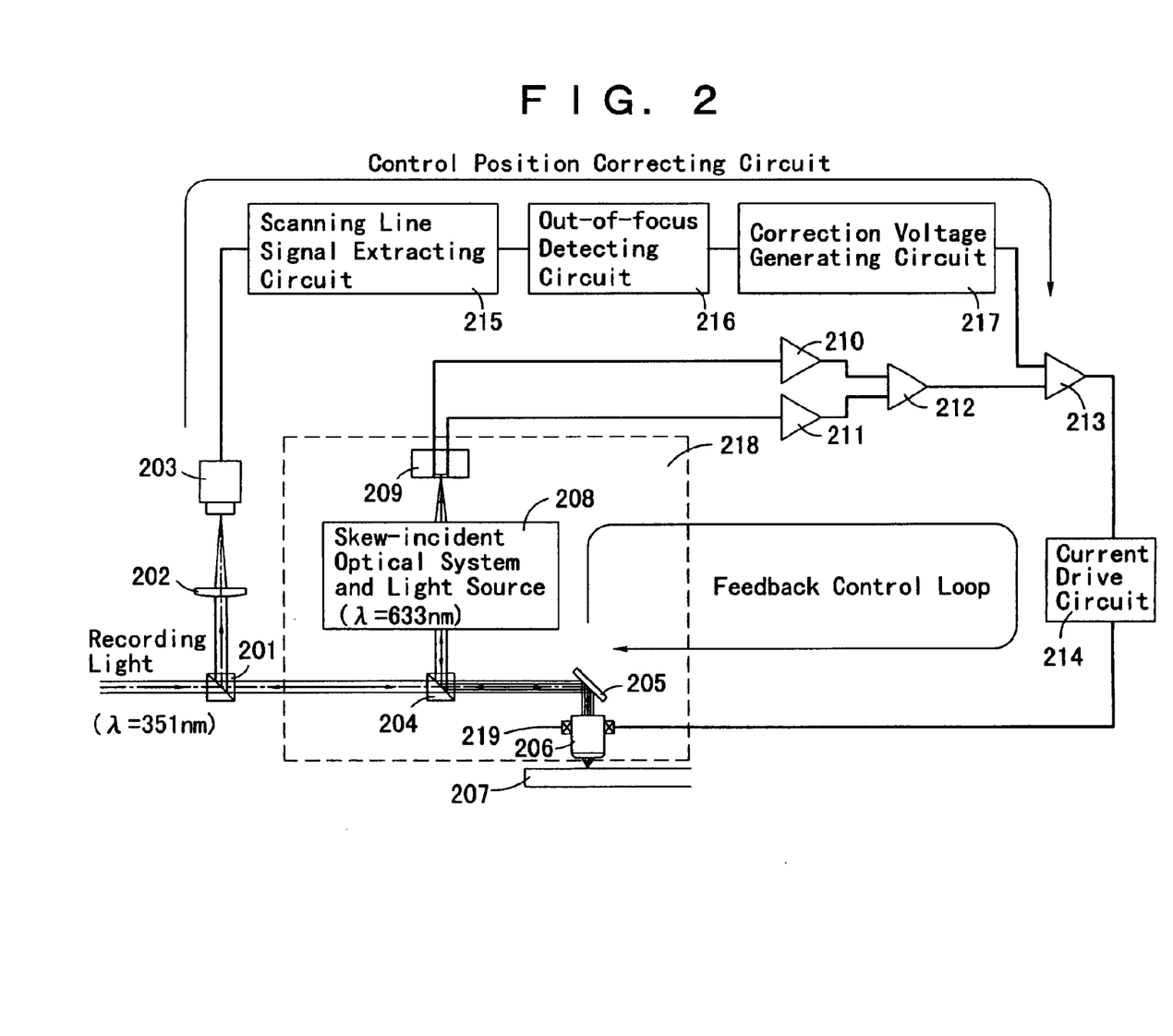
FIG. 2 is an outline view for describing a focusing method according to the preferred embodiment of the present invention.

FIG. 2 is an outline view showing specific structures of a portion in which a focusing control unit and a focal point deviation detecting unit are included in the unit for forming a master of a data storage medium according to the preferred embodiment. With reference to FIG. 2, a specific description will be given on a focusing control method, a focal point deviation detecting method and a method for forming a master of a data storage medium.

In FIG. 2, a beam splitter 201, a plano-convex lens 202, a CCD camera 203, a first dichroic mirror 204, a second dichroic mirror 205, an objective lens 206 mounting an actuator 219, and a recording medium 207 respectively correspond to the beam splitter 107, the plano-convex lens 110, the CCD camera 111, the first dichroic mirror 115, the second dichroic mirror 116, the objective lens 117 mounting the actuator 118, and the recording medium 112 which are shown in FIG. 1. Further, a skew-incident optical system 208 including a light source and a half-split photodiode 209 correspond to the focusing-control optical system 114 which is shown in FIG. 1.

In this unit for forming a master of a data storage medium, the skew-incident optical system 208 equipped with an He—Ne laser light source having a wavelength of 633 nm is disposed on a movable optical table 218. Laser light having a wavelength of 633 nm emitted from the He—Ne laser light source of the skew-incident optical system 208 is reflected by the first dichroic mirror 204 and the second dichroic mirror 205, and irradiated through the objective lens 206 mounting the actuator 219 upon the recording medium 207 in which a photoresist (photosensitive material film) is applied to a circular glass disk.

To be selected as the photoresist is one which is not sensitive to light having a wavelength of 633 nm as described above. A portion of the irradiated light, reflected by the recording medium 207 and travelling the same optical path, returns to the skew-incident optical system 208 and impinges upon the photodiode 209 whose light receiving surface is split into halves.

A skew method is a method in which light is incident upon the objective lens 206 with an optical axis of the light tilted from the vertical direction, and utilizing a phenomenon that the optical axis varies horizontally or vertically in accordance with a change in a distance between the objective lens 206 and the recording medium 207, a change in the distance between these two elements is detected.

Figure 4:
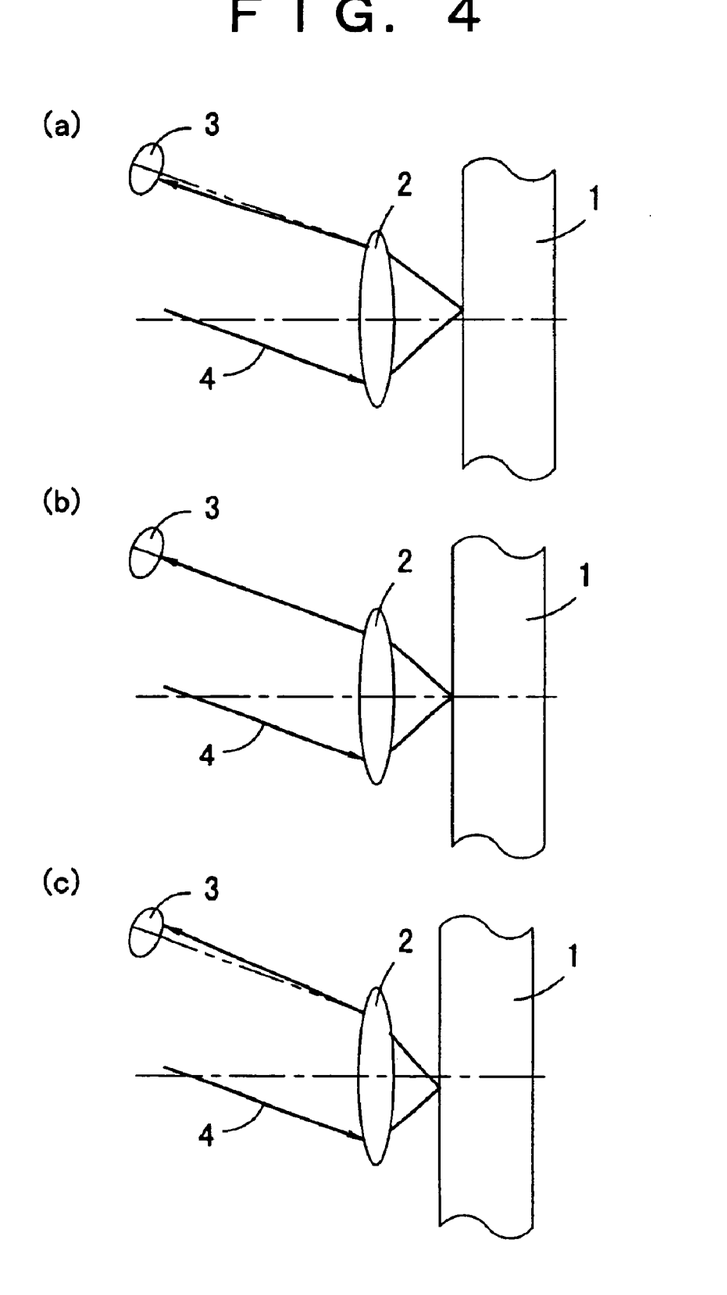
FIG. 4 is a schematic view for describing principles of a skew method.

Now, an oblique incident method, or the so-called skew method, will be described with reference to FIG. 4. In the skew method, a change in a distance between an objective lens 2 and a substrate 1 is detected in the following manner. That is, as shown in FIG. 4, light is allowed to enter the objective lens 2 and the substrate 1 with an optical axis 4 of the light tilted, ensuring that light transmitted by the objective lens 2 is reflected by the substrate 1 and thereafter transmitted by the objective lens 2 again. The light transmitted by the objective lens 2 once again is received by a detector 3 whose light receiving surface is split into halves. At this stage, using a difference between signals from the two light receiving surfaces of the detector 3, a change in the distance between the objective lens 2 and the substrate 1 is detected.

Assuming that a state as that shown in the section (b) in FIG. 4 is a state that the partition line between the light receiving surfaces of the detector 3 matches with an optical axis of reflected light, when the substrate 1 is farther as in the state (a) than in a state as that shown in the section (b) in FIG. 4, the optical axis of the reflected light is tilted, a difference between signals from the two light receiving surfaces changes, and based on this, the size and the direction of a change in the distance between the objective lens 2 and the substrate 1 are detected.

Further, as the substrate 1 becomes closer as shown in the section (c) in FIG. 4 than the state shown in the section (b) in FIG. 4, the optical axis of the reflected light is tilted reverse to the state shown in the section (a) in FIG. 4, a difference between the signals from the two light receiving surfaces has the opposite sign to that in the state shown in the section (a) in FIG. 4, and based on this, the size and the direction of a change in the distance between the objective lens 2 and the substrate 1 are detected.

According to the preferred embodiment, when the distance between the objective lens 2 and the substrate 1 changes, adjustment is performed such that the reflected light moves horizontally on the light receiving surfaces of the photodiode 209. The photodiode 209 is disposed in such a manner that the two split light receiving surfaces are side by side in the horizontal direction. As a result, when the distance between the objective lens 206 and the recording medium 207 changes, outputs from the respective light receiving surfaces, one on the left-hand side and the other on the right-hand side, of the photodiode 209 change.

The outputs from the left-hand side and the right-hand side light receiving surfaces of the photodiode 209 are amplified respectively by a first preamplifier 210 and a second preamplifier 211, and thereafter differentially amplified by a first differential amplifier 212. This converts changes in the left-hand side direction and the right-hand side direction of the optical axis on the light receiving surfaces of the half-split photodiode 209 into a positive and a negative electric signals. The output from the first differential amplifier 212 is fed to a current drive circuit 214 through a second differential amplifier 213, thereby driving the actuator 219 which is disposed to the objective lens 206.

This circuit system forms a feedback control loop for focusing control, that is, feedback control means in a unit for forming a master of a data recording medium or a focusing control unit, and functions to ensure that the second differential amplifier 213 outputs 0. Therefore, as other input value to the second differential amplifier 213 is changed, a control target value set for an output value of the first differential amplifier 212 is changed. This is the same as changing a control target value set for the distance between the objective lens 206 and the recording medium 207. Further, using light having a wavelength of 633 nm which is longer than that of the recording light, and hence, allowing to obtain an excellent S/N ratio in the half-split photodiode 209, feedback control is stable.

Meanwhile, a portion of the recording light is transmitted by the beam splitter 201 and thereafter by the first dichroic mirror 204, reflected by the second dichroic mirror 205, converged by the objective lens 206 mounting the actuator 219, and irradiated upon the recording medium 207. A portion of the irradiation is reflected at a surface of the recording medium 207, namely, a surface of the photoresist, and thereafter partially reflected by the beam splitter 201 through the first dichroic mirror 204 and the second dichroic mirror 205. The light reflected by the beam splitter 201 is converged by the plano-convex lens 202 and reaches a light receiving surface of the CCD camera 203, whereby the recording light is imaged in the shape of a spot on the recording medium 207.

The structure described above serves as position detecting means which detects a discrepancy of the distance between the objective lens 206 and the recording medium 207 from a desirable distance using the reflected light which is generated as the recording light is reflected by the surface of the recording medium 207, in a unit for forming a master of a data recording medium or a focusing control unit. The structure also serves as light receiving means for detecting an intensity distribution of light incident upon the light receiving surface in the focal point deviation detecting unit, and as such, detects an intensity distribution of the reflected light which is generated as the recording light modulated in accordance with information to be recorded is reflected by the recording medium 207 through the objective lens 206. To this end, the light receiving means is disposed such that the light receiving surface and the recording medium 207 are arranged confocal to each other, to thereby detect an intensity distribution of a spot of the reflected light which is projected on the light receiving surface, as the intensity distribution of the reflected light.

Now, a description will be given, with reference to FIG. 3, on spot shapes of the reflected light projected by the CCD camera 203 as they are when the distance between the objective lens 206 and the recording medium 207 changes. The focal point deviation detecting method according to the present invention will also be described while referring to FIG. 2.

In the focal point deviation detecting method, a discrepancy of the distance between the objective lens 206 and the recording medium 207 from the desirable distance is detected based on the intensity distribution of the reflected light which is generated as the recording light modulated in accordance with information to be recorded is reflected by the recording medium through the objective lens. More specifically, using an intensity at the center of a spot of the recording light projected on the light receiving surface which is positioned confocal with the recording medium and using a distance between the center of the spot and a point at which an intensity of a diffraction ring is maximum, a discrepancy of the distance between the objective lens and the recording medium from the desirable distance is detected. Alternatively, the discrepancy of the distance between the objective lens and the recording medium from the desirable distance is detected, based on an intensity at the center within the spot and an intensity of a diffraction ring of the spot.

Figure 3:
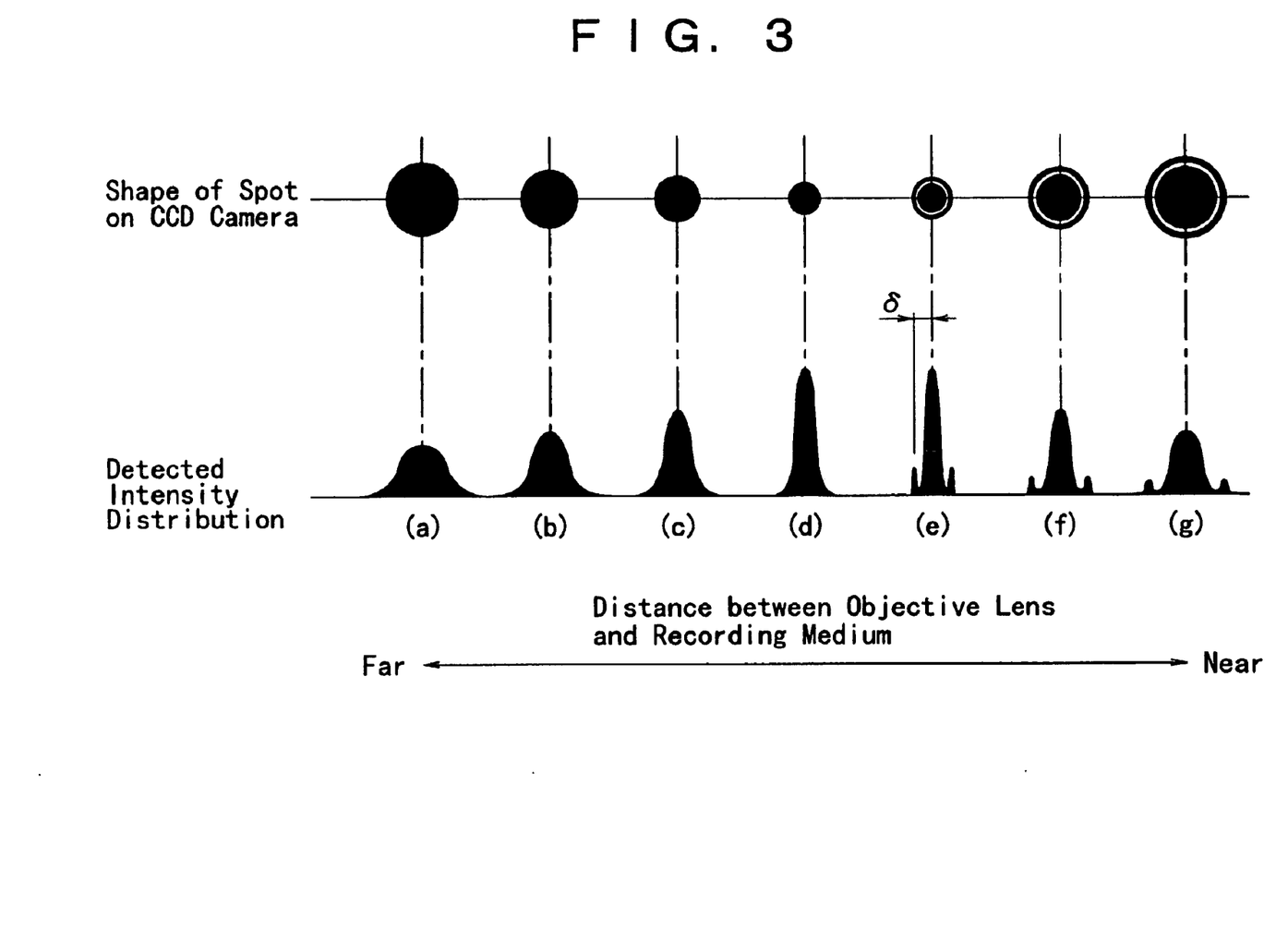
FIG. 3 is a schematic view for describing a change in the shape of a spot on a CCD camera according to the preferred embodiment of the present invention.

When distance between the objective lens 206 and the surface of the recording medium 207 (which is the surface of the photoresist) is beyond the position of a focal point of the objective lens 206, the spot, although projected in a circular shape, has a large diameter on the CCD camera, and therefore, has a low light intensity at the center (the state shown in the section (a) in FIG. 3).

As the distance between the two becomes shorter, the spot diameter gradually shrink, in accordance with which the light intensity at the center gradually increases (the states shown in the sections (b) and (c) in FIG. 3). With the surface of the recording medium 207 arriving at the position of the focal point of the objective lens 206, the size of the spot becomes the smallest and the intensity of the spot becomes the strongest (the state shown in the section (d) in FIG. 3).

As the distance between the two becomes even shorter, the surface of the recording medium 207 gradually shifts away from the position of the focal point, a diffraction-induced ring appears in the spot on the CCD camera, and the intensity at the center decreases (the states shown in the sections (e), (f) and (g) in FIG. 3). At this stage, a distance δ between a peak position of the diffraction ring and the center of the distribution increases as the objective lens 206 and the recording medium 207 become closer to each other, and as a result, the intensity of the diffraction ring becomes lower.

Since the recording medium 207 is a glass disk applied with the photoresist having a predetermined thickness, in order to expose and develop the photoresist and accurately form a fine pit, it is desirable to set the distance between the objective lens 206 and the recording medium 207 as described below. That is, considering the thickness of the photoresist, a distance which allows the recording light to focus at an intermediate position in the direction of the thickness of the photoresist is more preferable than a distance which allows the recording light to focus exactly at the surface of the photoresist of the recording medium 207. In other words, it is preferable that the position of the focal point deviates toward inside the photoresist. In terms of figures, it is desirable that the focal point is located in the range of ⅓ to ⅔ of the film thickness of the photoresist as measured from the surface of the photoresist. Further, it is most desirable that the focal point is located at a position which is approximately ½ of the film thickness of the photoresist as measured from the surface of the photoresist. In FIG. 3, the focal point is adjusted preferably to the state shown in the section (e) in FIG. 3, for example.

Now, a description will be given, with reference to FIGS. 5 and 6, on the reason why it is desirable to shift the position of the focal point of the reflected light toward inside the photoresist.

For the convenience of description, the reason will be described below based on a relationship between the size of a pit to record and offsetting with a control target position.

Figure 5:
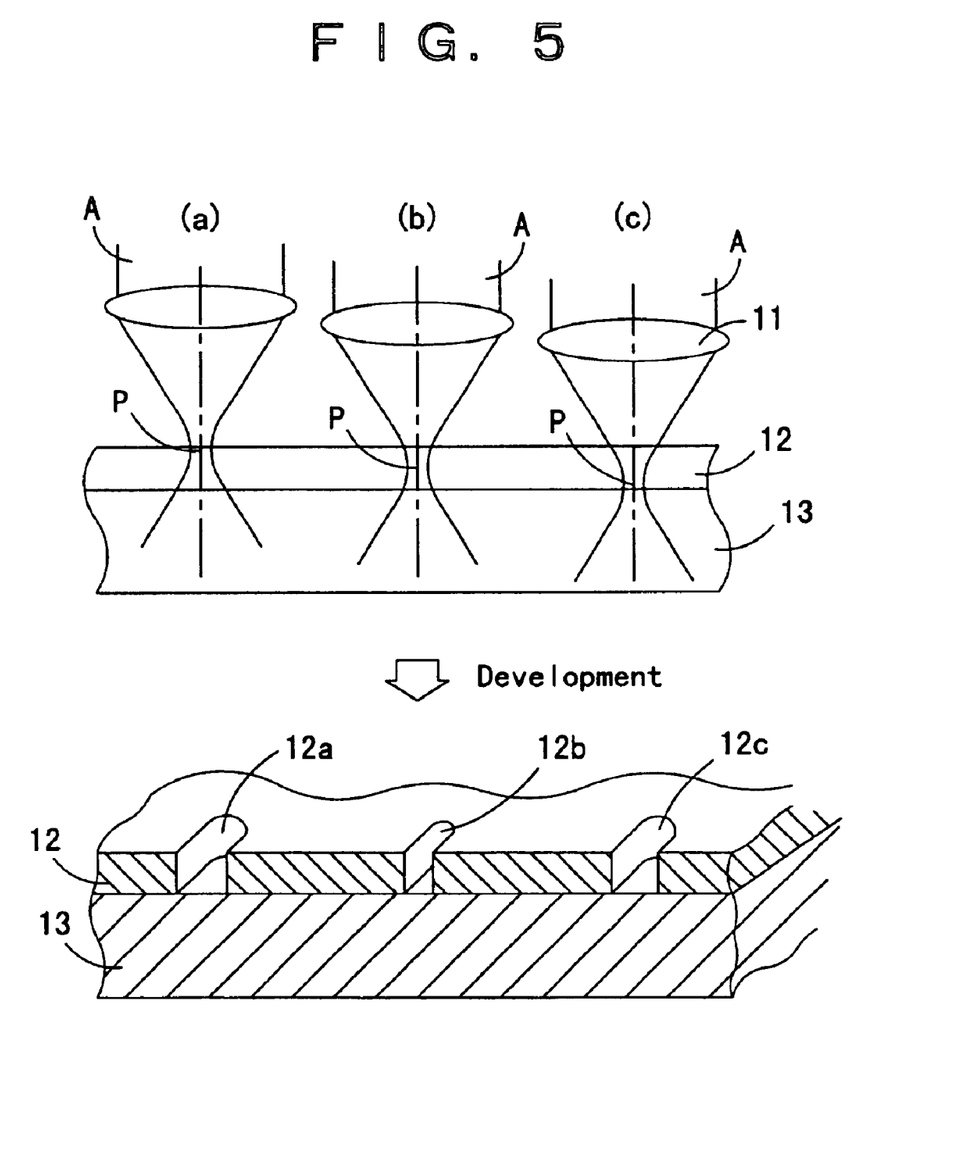
FIG. 5 is a schematic view showing a relationship between the position of a focal point of recording light and the size of a pit.

As shown in FIG. 5, with respect to a relationship between the position of a focal point of reflected light A converged by an objective lens 11 and the position of a photosensitive material film (photoresist) 12 which is formed on a glass base (glass disk) 13, in a state (b) where the focal point P is approximately at the center in the direction of the thickness of the photosensitive material film 12, the width of a pit 12b formed after development is minimum, which makes it possible to accurately form a fine pit. However, in a state (a) where the focal point P is approximately at a front layer of the photosensitive material film 12 or in a state (c) where the focal point P is approximately at an interface between the photosensitive material film 12 and the glass base 13, an average size of the reflected light which is converged inside the photosensitive material film 12 is large. Since the widths of pits 12a and 13c which are formed after development are wider than that of the pit 12b which is formed in the state (b), it is not easy to accurately form a fine pit.

Further, in a focusing-controlled state as well, there is a deviation (a focusing deviation, as generally known) which is determined by a gain of a feedback control system, and therefore, a focusing control position always varies within a range of the deviation.

Figure 6:
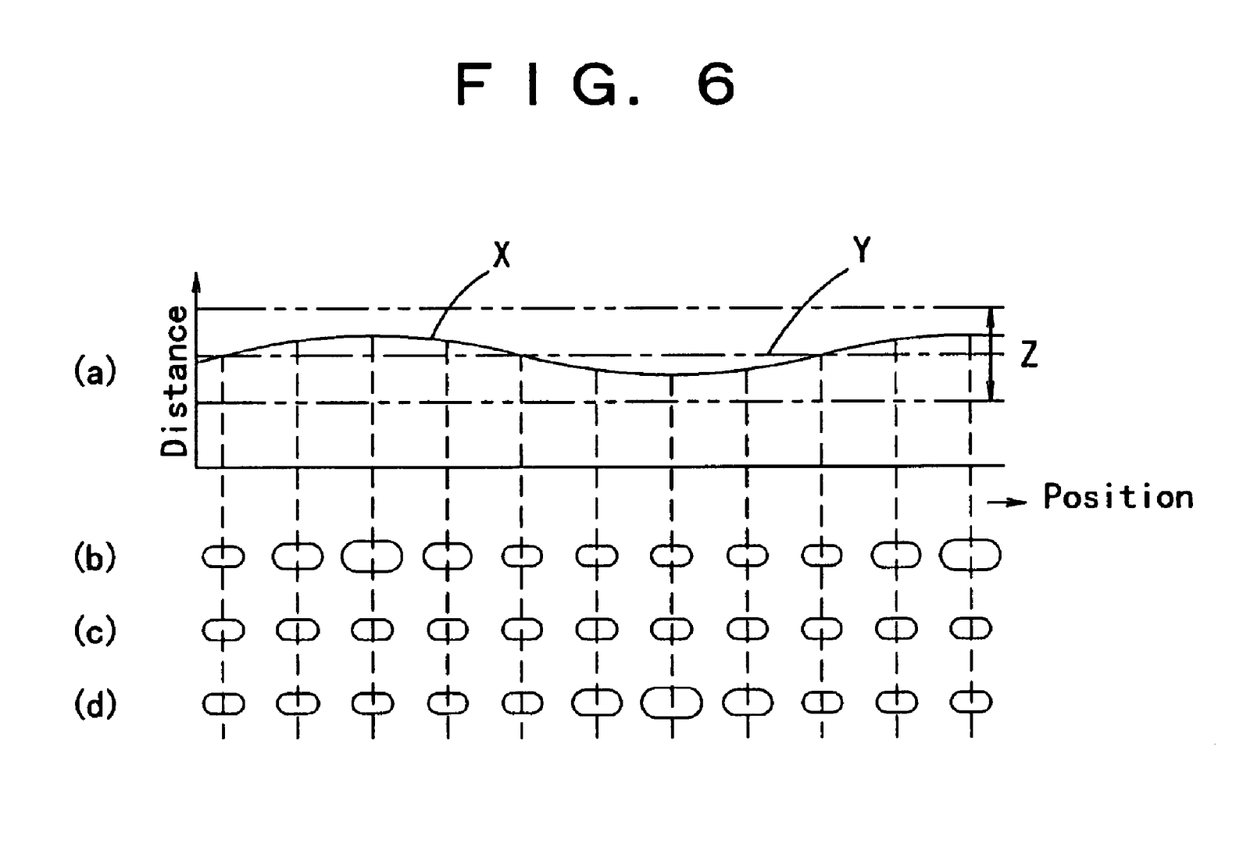
FIG. 6 is a schematic view showing a change in the size of a pit due to a focusing deviation.

FIG. 6 is a schematic view showing a change in the size of a pit due to a focusing deviation, between a situation that the position of a focal point is approximately at a front layer of a photosensitive material film, a situation that the position of a focal point is approximately at the center of the photosensitive material film, and a situation that the position of a focal point is approximately at an interface between the photosensitive material film and a glass base. The section (a) in FIG. 6 shows a relationship between a recording position on the glass base and a distance between the glass base and the objective lens. The curve X expresses that due to a focusing deviation, the distance between the glass base and the objective lens changes depending on where recording light is located on the glass base. The straight line Y denotes an average distance between the glass base and the objective lens. In the section (a) in FIG. 6, the symbol Z denotes a width which corresponds to the thickness of the photosensitive material film.

The section (b) in FIG. 6 shows a change in the size of a pit which is formed in a situation that the position of the focal point is approximately at the front layer of the photosensitive material film. The section (d) in FIG. 6 shows a change in the size of a pit which is formed in a situation that the position of the focal point is approximately at the center of the photosensitive material film.

The section (d) in FIG. 6 shows a change in the size of a pit which is formed in a situation that the position of the focal point is approximately at the interface between the photosensitive material film and the glass base.

In the section (b) in FIG. 6, on the side where the distance from the objective lens is large, since the focal point is located outside the photosensitive material film, an average size of the converged recording light accordingly increases, and the pit becomes large. Conversely, in the section (d) in FIG. 6, on the side where the distance from the objective lens is small, the focal point is located outside the photosensitive material film, an average size of the converged recording light accordingly increases, and the pit becomes large. In the section (c) in FIG. 6, since the focal point is located always approximately at the center of the photosensitive material film within the range of variation of a focusing deviation, a pit having a constant and stable is formed.

To accurately form a fine pit and reduce a change in the shape or the size of a pit to record regardless of a change in the position of the focal point due to a focusing deviation, it is desirable to have the recording light to focus in the range of ⅓ to ⅔ of the film thickness of the photosensitive material film as measured from the surface of the photosensitive material film. Further, it is most desirable that the focal point of the recording light is located at a position which is approximately at the center (½) of the film thickness of the photosensitive material film.

Now, a numerical description will be given on the size of a pit. An optical disk made from the master of a data recording medium described above reproduces, on its surface of polycarbonate, for instance, pits which are formed on the master using a stamper. In the reproduced disk, tracking servo or the like is performed utilizing a change in the intensity of the reflected light which is created as the reflected light is cancelled due to interference between the reflected light inside the pits and the reflected light outside the pits. Depths P of the pits for obtaining a phase difference which is necessary to cancel the reflected light are set in the range between $(1/8)\cdot\lambda/n$ and $(1/4)\cdot\lambda/n$, for example, where $\lambda$ is a wavelength of reproducing laser light and n is a refractive index of the reproducing laser light. When the wavelength of the reproducing laser light is 650 nm and a refractive index of polycarbonate is 1.5, for example, the depths P of the pits are 50 through 100 nm. Meanwhile, widths of the pits are 0.1 through 0.5 $\mu$m±0.01 $\mu$m, for instance, and lengths of the pits are about 0.1 through 3 $\mu$m, for example. The pits may be a continuous groove, in which case a width of the groove is the same as the widths of the pits.

As described above, the depths of the pits are about 1/10 through 1/3 of the widths of the pits, which are not negligible as compared with the widths of the pits. Hence, during manufacturing of the master, the widths of the pits are largely influenced by a change in the size of the recording light which is caused in accordance with whether the focal point of the recording light is located at the surface of the photoresist, approximately at the center, or at the interface with the glass base. Noting this, for the purpose of accurately forming pits, it is effective to locate the focal point at such a position which can reduce the average diameter of the recording light as much as possible, as described above.

For detection of a discrepancy of the distance between the objective lens 206 and the recording medium 207 from the ideal value based on the shape of the spot described earlier, first, the output of the CCD camera 203 is supplied to a scanning line signal extracting circuit 215. As a scanning line which maximizes the intensity in an area where the spot is created is extracted, a scanning line which runs through the center of the shape of the imaged spot is extracted.

Figure 7:
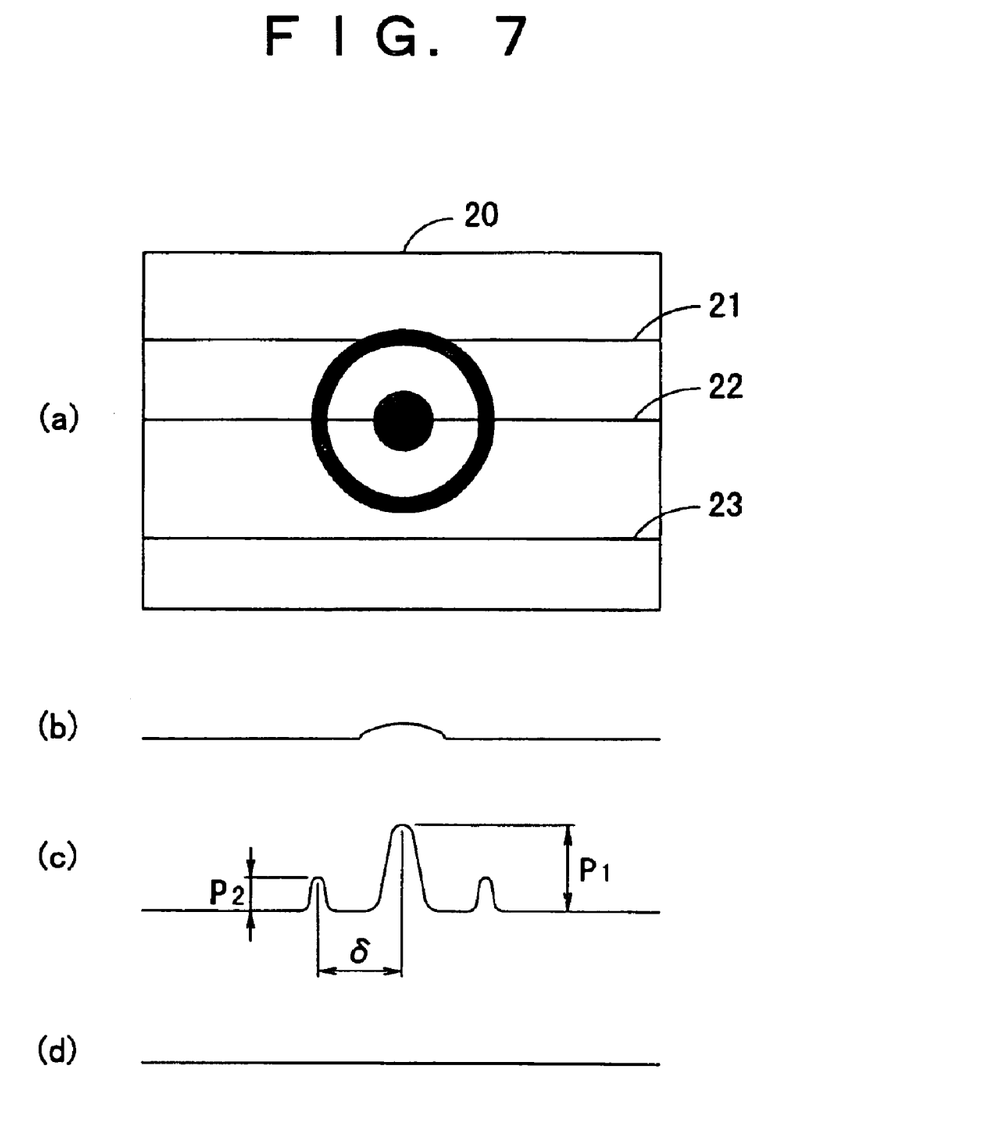
FIG. 7 is a schematic view showing a relationship between the shape of a spot on a CCD camera and an image signal.

More particularly, when a spot image 20 as that shown in the section (a) in FIG. 7, for example, is obtained in the CCD camera 203, an image signal is extracted scanning line by scanning line and A/D converted. For instance, a video signal as that shown in the section (b) in FIG. 7 is obtained for a scanning line 21 running through an area near the spot, a video signal as that shown in the section (c) in FIG. 7 is obtained for a scanning line 21 running through a central portion of the spot, while a video signal as that shown in the section (d) in FIG. 7 is obtained for a scanning line 23 running outside the spot. These signals are A/D converted. As digitized levels of the image signals are detected scanning line by scanning line, one scanning line for which a peak value of a signal level is maximum is extracted.

Next, an out-of-focus detecting circuit 216 detects a maximum intensity $P_1$ of the extracted scanning line based on signal processing performed by a CPU or the like, and compares with a preliminarily set maximum value. If the maximum intensity $P_1$ is weaker than the maximum value, the out-of-focus detecting circuit 216 detects whether there is a diffraction ring. Detecting no diffraction ring, the out-of-focus detecting circuit 216 determines that the distance between the objective lens 206 and the recording medium 207 is far. Detecting a diffraction ring, the out-of-focus detecting circuit 216 detects a distance $\delta$ between the peak and the center of the spot, and compares the distance $\delta$ with a predetermined value. If the detected distance $\delta$ is larger than the predetermined value, the out-of-focus detecting circuit 216 determines that the distance between the objective lens 206 and the recording medium 207 is close. If the detected distance $\delta$ is smaller than the predetermined value, the out-of-focus detecting circuit 216 determines that the objective lens 206 and the recording medium 207 are at the desired distance from each other.

The maximum intensity $P_1$ of the scanning line described above can be calculated by detecting a peak value of a signal level of the extracted scanning line. Further, the distance $\delta$ described above can be calculated by detecting the timing of the peak in the signal level of the image signal regarding the extracted scanning line (This timing corresponds to the center of the spot.) and the timing at which an adjacent maximum value appears (This timing corresponds to the center of the diffraction ring.) and by measuring a period between the two timing. Whether there is a diffraction ring can be detected by detecting whether the maximum value appears.

Instead of detecting the distance $\delta$ between the peak of the diffraction ring and the center of the spot, an intensity $P_2$ of the peak of the diffraction ring may be compared with a predetermined value. When the intensity $P_2$ is weaker, it is determined that the distance between the objective lens 206 and the recording medium 207 is close. When the intensity $P_2$ is larger than the predetermined value, it is determined that the objective lens 206 and the recording medium 207 are at the desired distance from each other.

The intensity $P_2$ of the peak of the diffraction ring can be calculated by detecting a level of an adjacent maximum value to the peak signal level with respect to the image signal representing the extracted scanning line.

The signal expressing the judgement whether the distance is far or close made by the out-of-focus detecting circuit 216 is fed to a correction voltage generating circuit 217 which will then generate a predetermined voltage. The second differential amplifier 213 receives a difference from the output of the first differential amplifier 212, whereby the control target value is changed. The signal expressing whether the distance is far or close described above is a maximum intensity of the extracted scanning line and the distance $\delta$ or the intensity of the diffraction ring.

From the scanning line signal extracting circuit 215 to the correction voltage generating circuit 217 described above form a control position correcting circuit.

The structure above serves as control position correcting means which corrects the control target position set for the feedback control means such that the distance between the objective lens 206 and the recording medium 207 becomes the desirable distance based on the discrepancy detected by the position detecting means, in a unit for forming a master of a data recording medium or a focusing control unit. Further, the structure up to the out-of-focus detecting circuit 216 serves as judging means which judges an intensity distribution of the light which is detected by the light receiving means, in the focal point deviation detecting unit. As the judging means judges an intensity distribution of the reflected light which is detected, a discrepancy of the distance between the objective lens 206 and the recording medium 207 from the desirable distance is detected. To this end, the judging means judges an intensity at the center inside the spot and a distance between the center of the spot and a point at which an intensity of a diffraction ring is maximum or judges an intensity at the center inside the spot and an intensity of a diffraction ring at the spot, to thereby detect the discrepancy of the distance between the objective lens 206 and the recording medium 207 from the desirable distance.

Further, a similar effect to the above is also obtained as the output of the correction voltage generating circuit 217 is supplied to an offset adjustment terminal of the first differential amplifier 212, instead of using the second differential amplifier 213.

According to the present invention, it is possible to always control the distance between the objective lens 206 and the recording medium 207 to the desirable distance during recording as well. Since a change in the position of the focal point is a slow change in time, such control above of the control position is merely an auxiliary function to feedback control using light whose wavelength is long. Therefore, it is desirable to perform such control position correction in a slow cycle which is 1 Hz or slower, so as not to create an adverse affect on a frequency characteristic of feedback control.

Since the focusing method and the focal point control unit described above are used in the preferred embodiment of the present invention, a data storage medium master generating method and a data storage medium master generating unit as well are realized, with which it is always possible to perform stable focusing control, and hence, correct the position of the focal point of the recording light, i.e., the distance between the objective lens 206 and the recording medium 207, to the desirable distance even during recording.

What is claimed is:

1. A focusing method used in a unit for forming a master of a data recording medium in which recording light which is modulated in accordance with information to be recorded is converged through an objective lens which is focusing-controlled such that a distance from a recording medium, in which a photosensitive material film is applied to a surface of a base, remains constant and information is recorded on said recording medium, wherein the focusing control of said objective lens is executed to position a focal point of said objective lens a predetermined fine distance which is smaller than a film thickness of said photosensitive material film, within said photosensitive material film relative to a surface of said photosensitive material film.

2. A focusing method in accordance with claim 1, wherein said predetermined fine distance has a value which is in the range of approximately ⅓ to ⅔ of the film thickness of said photosensitive material film.

3. A focusing method in accordance with claim 1, wherein said predetermined fine distance has a value which is approximately ½ of the film thickness of said photosensitive material film.

4. A focusing method in accordance with claim 1, wherein:

feedback control is performed using different light whose wavelength is longer than that of said recording light such that a distance between said objective lens and said recording medium remains constant, a discrepancy of the distance between said objective lens and said recording medium from a desirable distance is detected using reflected light which is generated as said recording medium reflects said recording light, and a control target position for said feedback control is corrected based on said detected discrepancy such that the distance between said objective lens and said recording medium becomes said desirable distance, whereby said objective lens is focusing-controlled.

5. A focusing method used in a unit for forming a master of a data recording medium in which recording light which is modulated in accordance with information to be recorded is converged through an objective lens which is focusing-controlled such that a distance from a recording medium remains constant and information is recorded on said recording medium, wherein:

the feedback control is performed using different light whose wavelength is longer than that of said recording light such that a distance between said objective lens and said recording medium remains constant, a discrepancy of the distance between said objective lens and said recording medium from a desirable distance is detected using reflected light which is generated as said recording medium reflects said recording light, and a control target position for said feedback control is corrected based on said detected discrepancy such that the distance between said objective lens and said recording medium becomes said desirable distance.

6. A method of detecting a deviation of a focal point position characterized in that, based on an intensity distribution of reflected light which is generated as a recording medium reflects through an objective lens recording light which is modulated in accordance with information to be recorded, a discrepancy of a distance between said objective lens and said recording medium from a desirable distance is detected, wherein;

the intensity distribution of said reflected light is an intensity distribution of a spot of said reflected light which is projected on a light receiving surface which is arranged confocal with respect to said recording medium, and based on an intensity at the center inside said spot and a distance between the center of said spot and a point at which an intensity of a diffraction ring is maximum, said discrepancy of the distance between said objective lens and said recording medium from said desirable distance is detected.

7. A method of detecting a deviation of a focal point position characterized in that, based on an intensity distribution of reflected light which is generated as a recording medium reflects through an objective lens recording light which is modulated in accordance with information to be recorded, a discrepancy of a distance between said objective lens and said recording medium from a desirable distance is detected, wherein:

the intensity distribution of said reflected light is an intensity distribution of a spot of said reflected light which is projected on a light receiving surface which is arranged confocal with respect to said recording medium, and based on an intensity at the center inside said spot and an intensity of a diffraction ring of said spot, said discrepancy of the distance between said objective lens and said recording medium from said desirable distance is detected.

8. A method of forming a master of a data recording mediums in which recording light which is modulated in accordance with information to be recorded is converged through an objective lens which is focusing-controlled such that a distance from a recording medium remains constant and information is recorded on said recording medium, wherein the focusing control of said objective lens is executed to position a focal point of said objective lens a predetermined fine distance, which is smaller than a film thickness of a photosensitive material film, within said photosensitive material film relative to a surface of said photosensitive material film.

9. A method of forming a master of a data recording medium in accordance with claim 8, wherein said predetermined fine distance has a value which is in the range of approximately ⅓ to ⅔ of the film thickness of said photosensitive material film.

10. A method of forming a master of a data recording medium in accordance with claim 8, wherein said predetermined fine distance has a value which is approximately ½ of the film thickness of said photosensitive material film.

11. A method of forming a master of a data recording medium in accordance with claim 8, wherein:
feedback control for maintaining a distance between said objective lens and said recording medium constant is performed using different light whose wavelength is longer than that of said recording light,
a discrepancy of the distance between said objective lens and said recording medium from a desirable distance is detected using reflected light which is generated as said recording medium reflects said recording light, and
a control target position for said feedback control is corrected based on said detected discrepancy such that the distance between said objective lens and said recording medium becomes said desirable distance, whereby said objective lens is focusing-controlled.

12. A method of forming a master of a data recording medium in which recording light which is modulated in accordance with information to be recorded is converged through an objective lens which is focusing-controlled such that a distance from a recording medium remains constant and information is recorded on said recording medium, wherein:
the feedback control is performed using different light whose wavelength is longer than that of said recording light such that a distance between said objective lens and said recording medium remains constant,
a discrepancy of the distance between said objective lens and said recording medium from a desirable distance is detected using reflected light which is generated as said recording medium reflects said recording light, and
a control target position for said feedback control is corrected based on said detected discrepancy such that the distance between said objective lens and said recording medium becomes said desirable distance.

13. A focusing control unit used in a unit for forming a master of a data recording medium in which recording light which is modulated in accordance with information to be recorded is converged through an objective lens which is focusing-controlled such that a distance from a recording medium remains constant and information is recorded on said recording medium, said focusing control unit comprising
a focusing control device that focusing-controls said objective lens to position a focal point of said objective lens a predetermined fine distance, which is smaller than a film thickness of a photosensitive material film, within said photosensitive material film relative to a surface of said photosensitive material film.

14. A focusing control unit in accordance with claim 13, wherein said predetermined fine distance has a value which is in the range of approximately ⅓ to ⅔ of the film thickness of said photosensitive material film.

15. A focusing control unit in accordance with claim 13, wherein said predetermined fine distance has a value which is approximately ½ of the film thickness of said photosensitive material film.

16. A focusing control unit in accordance with claim 13, wherein said focusing control device comprises:
feedback control means for maintaining a constant distance between said objective lens and said recording medium, said feedback control means employing a different light whose wavelength is longer than that of said recording light for feedback control;
position detecting means for detecting a discrepancy of the distance between said objective lens and said recording medium from a desirable distance using reflected light which is generated as said recording medium reflects said recording light; and
control position correcting means for correcting a control target position of said feedback control means such that the distance between said objective lens and said recording medium becomes said desirable distance based on said discrepancy which is detected by said position detecting means.

17. A focusing control unit used in a unit for forming a master of a data recording medium in which recording light which is modulated in accordance with information to be recorded is converged through an objective lens which is focusing-controlled such that a distance from a recording medium remains constant and information is recorded on said recording medium, said focusing control unit comprising:
feedback control means for maintaining a constant distance between said objective lens and said recording medium, said feedback control means employing a different light whose wavelength is longer than that of said recording light for feedback control;
position detecting means for detecting a discrepancy of the distance between said objective lens and said recording medium from a desirable distance using reflected light which is generated as said recording medium reflects said recording light; and
control position correcting means for correcting a control target position of said feedback control means such that the distance between said objective lens and said recording medium becomes said desirable distance based on said discrepancy which is detected by said position detecting means.

18. A focal point deviation detecting unit comprising:
a light receiving means for detecting an intensity distribution of light that impinges upon a light receiving surface; and
a judgement means for judging the intensity distribution of said light that is detected by said light receiving means, wherein:
said light receiving means detects an intensity distribution of reflected light that is generated as a recording medium reflects, through an objective lens, recording light that is modulated in accordance with information to be recorded,
said judgement means judges the intensity distribution of said reflected light that is detected, whereby a discrepancy of the distance between said objective lens and said recording medium from a desirable distance is detected,
a light receiving surface of said light receiving means is arranged confocal with respect to said recording medium,
an intensity distribution of a spot of said reflected light which is projected on said light receiving surface is detected as the intensity distribution of said reflected light, and
said judgement means judges an intensity at the center inside said spot and a distance between the center of said spot and a point at which an intensity of a diffraction ring is maximum, to thereby detect said discrepancy of the distance between said objective lens and said recording medium from said desirable distance.

19. A focal point deviation detecting unit comprising:
a light receiving means for detecting an intensity distribution of light that impinges upon a light receiving surface; and
a judgement means for judging the intensity distribution of said light that is detected by said light receiving means, wherein:
said light receiving means detects an intensity distribution of reflected light that is generated as a recording medium reflects, through an objective lens, recording light that is modulated in accordance with information to be recorded,
said judgement means judges the intensity distribution of said reflected light that is detected, whereby a discrepancy of the distance between said objective lens and said recording medium from a desirable distance is detected,
a light receiving surface of said light receiving means is arranged confocal with respect to said recording medium,
an intensity distribution of a spot of said reflected light which is projected on said light receiving surface is detected as said intensity distribution of said reflected light, and
said judgement means judges an intensity at the center inside said spot and an intensity of a diffraction ring of said spot, to thereby detect said discrepancy of the distance between said objective lens and said recording medium from said desirable distance.

20. A unit for forming a master of a data recording medium in which recording light which is modulated in accordance with information to be recorded is converged through an objective lens which is focusing-controlled such that a distance from a recording medium remains constant and information is recorded on said recording medium, said unit comprising
a focusing control device that focusing-controls said objective lens to position a focal point of said objective lens a predetermined fine distance, which is smaller than a film thickness of a photosensitive material film, within said photosensitive material film relative to a surface of said photosensitive material film.

21. A unit for forming a master of a data recording medium in accordance with claim 20, wherein said predetermined fine distance has a value which is in the range of approximately ⅓ to ⅔ of the film thickness of said photosensitive material film.

22. A unit for forming a master of a data recording medium in accordance with claim 20, wherein said predetermined fine distance has a value which is approximately ½ of the film thickness of said photosensitive material film.

23. A unit for forming a master of a data recording medium in accordance with claim 20, wherein said focusing control device comprises:
feedback control means for maintaining a constant distance between said objective lens and said recording medium, said feedback control means employing a different light whose wavelength is longer than that of said recording light for feedback control;
position detecting means for detecting a discrepancy of the distance between said objective lens and said recording medium from a desirable distance using reflected light which is generated as said recording medium reflects said recording light; and
control position correcting means for correcting a control target position of said feedback control means such that the distance between said objective lens and said recording medium becomes said desirable distance based on said discrepancy which is detected by said position detecting means.

24. A unit for forming a master of a data recording medium in which recording light which is modulated in accordance with information to be recorded is converged through an objective lens which is focusing-controlled such that a distance from a recording medium remains constant and information is recorded on said recording medium, said focusing control unit comprising:
feedback control means for maintaining a constant distance between said objective lens and said recording medium, said feedback control means employing a different light whose wavelength is longer than that of said recording light for feedback control;
position detecting means for detecting a discrepancy of the distance between said objective lens and said recording medium from a desirable distance using reflected light which is generated as said recording medium reflects said recording light; and
control position correcting means for correcting a control target position of said feedback control means such that the distance between said objective lens and said recording medium becomes said desirable distance based on said discrepancy which is detected by said position detecting means.

* * * * *